United States Patent [19]

Usizima et al.

[11] 3,745,399

[45] July 10, 1973

[54] MOUNTING APPARATUS FOR ELECTRICAL EQUIPMENT

[75] Inventors: Syozi Usizima, Urama, Saitama; Sigeo Ohara; Hirosi Unno, both of Tokyo, all of Japan

[73] Assignee: Meisei Electric Co., Ltd., Tokyo, Japan

[22] Filed: Mar. 16, 1970

[21] Appl. No.: 19,737

[30] Foreign Application Priority Data

Mar. 26, 1969 Japan .............................. 44/22838

[52] U.S. Cl. ......... 317/99, 317/101 D, 317/101 DH, 312/324

[51] Int. Cl. .............................................. H05k 7/16

[58] Field of Search .................... 312/120, 294, 298, 312/324, 326; 317/99, 101 CB, 101 DH, 117–120

[56] References Cited

UNITED STATES PATENTS

| | | | |
|---|---|---|---|
| 3,376,479 | 4/1968 | Wines | 317/101 DH |
| 2,928,555 | 3/1960 | Childs | 317/101 D |
| 2,994,807 | 8/1961 | Devine | 317/101 CB |
| 3,131,330 | 4/1964 | Allen | 317/99 |

FOREIGN PATENTS OR APPLICATIONS

| | | | |
|---|---|---|---|
| 1,371,826 | 0/1964 | France | 317/101 CB |

*Primary Examiner*—Herman J. Hohauser
*Assistant Examiner*—Gerald P. Tolin
*Attorney*—McGlew and Toren

[57] ABSTRACT

In the disclosed apparatus, a cabinet encloses two panel assemblies, each of which is composed of two panels. In each assembly,two panels are articulated about a common hinge. Printed circuit boards are mounted on windows in the panels so that the backsides of the boards face each other. Spacer means on the panel prevent the backsides of the boards from striking each other as the panels swing close to each other. An extension arm,which is hinged to the wall of the cabinet,-holds the hinge in the front one of the assemblies outward from the wall. A second extension arm, which is hinged to a post extending outward from the wall, holds the hinge of the rear of the two assemblies. Thus each of the assemblies is allowed to articulate on separate arms about separate hinges. These hinges are displaced laterally within the cabinet so that each assembly can be made to swing out of the cabinet without distrubing the other.

12 Claims, 8 Drawing Figures

PATENTED JUL 10 1973

3,745,399

SHEET 1 OF 3

INVENTOR.
SYOZI USIZIMA
SIGEO OHARA
HIROSI UNNO
BY
McGlew & Toren
ATTORNEYS

INVENTOR.
SYOZI USIZIMA
SIGEO OHARA
HIROSI UNNO
BY McGlew & Toren
ATTORNEYS

INVENTOR.
SYOZI USIZIMA
SIGEO OHARA
HIROSI UNNO
BY
McGlew & Toren
ATTORNEYS

MOUNTING APPARATUS FOR ELECTRICAL EQUIPMENT

BACKGROUND OF THE INVENTION

The present invention relates to therefore, mounting apparatuses for electrical equipment and particularly to supports for telephone equipment.

In communication equipment, printed circuit boards are frequently mounted with insert type of connectors. Such connector insert systems are frequently incapable of firmly supporting large printed circuit boards or may also suffer from being incapable of supporting accessories. As an alternative, printed circuit boards are wired directly onto panels without connectors. However, in such cases, the boards have to be removed for inspecting one or the other side of the board.

An object of the invention is to eliminate the foregoing drawbacks and to permit maintenance and inspection of printed circuit boards that are conveniently mounted.

SUMMARY OF THE INVENTION

The main object of the present invention is to provide a structure in the gate mechanism of the casing mounted on the communication machine such as telephone exchange and the like comprising a single gate having two panels, said single panel is provided with gate rotating means for withdrawing said single gate out of the casing and moreover in said single gate two panels are to be opened respectively independent from said gate rotating means.

The other object of the present invention is to provide a structure wherein the center of the movement of rotation for withdrawing out each of the gates are arranged to be dislocated from each other when two or more gates are to be provided within the casing of the communication machine such as telephone exchange and the like.

The another object of the present invention is to provide a structure wherein said gate rotating means is fixed with rotational arm members for supporting an alternative panel or panel connecting member in said panel rotating means, thereby is able to withdraw the gate out of said casing.

The further object of the present invention is to provide a structure wherein two panels of the panel rotating means are connected to each other at one end thereof by means of a hinge.

The still further object of the present invention is to provide a structure wherein each of said two panels having a fixing surface for accessory parts at one side thereof respectively are disposed in such a position that the other side of each panel reversing to said fixing surface are oppositely facing to each other with an interspace therebetween.

The further and another object of the present invention is to provide a structure wherein at least one of said two panels is fixed with a stopper at the rear surface thereof for providing an interspace between the rear surface of said two panels.

The further and still another object of the present invention is to provide a structure wherein said stopper is formed at one end opposite to panel rotating means in the shape of a bent portion.

The still more further object of the present invention is to provide a structure wherein at least one panel is provided with a bent portion formed at one end thereof, said bent portion is connected with the other panel by means of a hinge to provide an interspace between two panels for fixing accessory parts.

The further and another more object of the present invention is to provide a structure wherein two panels are connected respectively with a spacer at both ends thereof by means of a corresponding hinge to provide an interspace between two panels for fixing accessory parts thereto.

The still further and another more object of the present invention is to provide a structure wherein at least one of said two panels is provided with a window for securing accessory parts thereto.

The still further and another more object of the present invention is to provide a structure wherein the panel is provided with a recess at the hinge-fixing side thereof.

In order to afford a clearer understanding of this invention and of the manner together with advantages, detailed description in the form of an embodiment follows.

BRIEF DESCRIPTION OF THE DRAWINGS

The present invention shall be described in reference to the attached drawings in which.

DETAILED DESCRIPTION OF PREFERRED EMBODIMENTS

Figure 1:
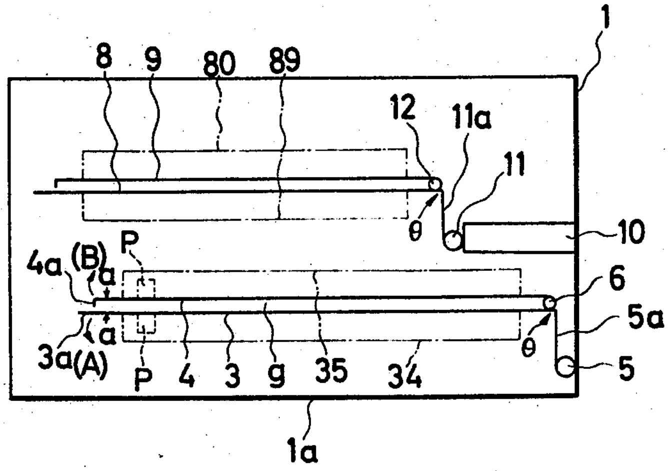
FIG. 1 is a schematic plan view of an embodiment of the present invention.

Reference is now made to the drawings by way of example, and in particular to FIG. 1 wherein there is shown a specific embodiment of the invention. A casing or cabinet 1 includes a post or frame 10 for reinforcing the cabinet as well as for supporting the back gate or rear panel assembly Panels 3 and 4, respectively, hold printed circuit boards. A hinge 5 fixes the front gate or panel assembly thereto. 6 denotes a hinge of a panel releasing mechanism for connecting between panels 3 and 4.

The panel 3 is arranged to be rotatable about the hinge 5 in the direction indicated by an arrow A and the panel 4 to be rotatable about the hinge 6 in the direction indicated by an arrow B respectively, so that panels 3 and 4 are disposed correlatively to make a diverging angle about the hinge 6.

The arm member **5*a* is interposed between hinges 5 and 6 to constitute in secured relative position between said arm member 5*a* and the panel 3 by a settled angle $\theta$ as shown in FIG. 1, that is, panels 3 and 4** are gathered together to be withdrawn outwardly by movement of rotation with a radial dimension equal to the length of said arm member 5a for releasing said panel 4 from the panel 3 at the outside of the casing 1.

In such way, the front gate portion is constructed with panels 3 and 4 together with hinges 4 and 5 also with the intervening arm member 5a.

In FIG. 1, the reference numerals 8 and 9 designate panels for fixing accessory parts the post 10 so as to be constituted to have enough length available for avoiding collision of two gates with each other when the front and the back gates are opened. The reference numeral 11 designates a hinge for fixing the back gate or assembly. A hinge 12 serves for connecting panels 8 and 9 to each other so the back gate portion is constructed similar to the front gate portion. The designation by the reference numerals 8, 9, 11, 12 is comparable with the designation of the reference numerals 3, 4, 5 and 6 respectively.

Now the hinge 5 is shown to be fixed directly to the casing 1 and the hinge 11 to be fixed to the post 10 which is secured to said casing 1. However, hinges 5 and 11 fixed to the posts of two gate portions are arranged so their relative positions and the arm members 5a and 11a avoid obstacles that may occur during inspection of the front assembly with the back assembly or gate is withdrawn. Thus each of the assemblies is provided with hinges 5 and 11 fixed to the cabinet 1 or having a fixed part integral with said casing 1.

In FIG. 1, optional accessory parts are fixed to the panels 3 and 4. The outer end 3a, 4a of the panels 3 and 4 have at least one bent portion to space the panels from each other. This produces a gap that presents portions such as printed circuit boards p on the respective boards from coming into contact with each other. As is shown in the drawings, the center of rotational movement of the gate rotational mechanisms 5 and 11 in each gate portion are dislocated from each other for smooth and easy movement of rotation as well as for avoiding collision of said gate portions with each other during and after movement of rotation by said mechanisms.

Figure 2:
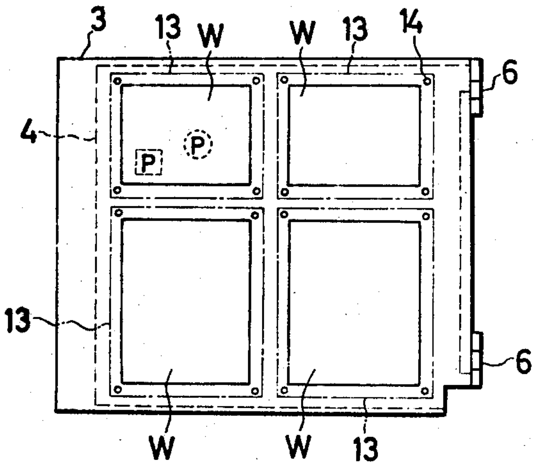
FIG. 2 is a frontal elevation of FIG. 1.
Figure 3:
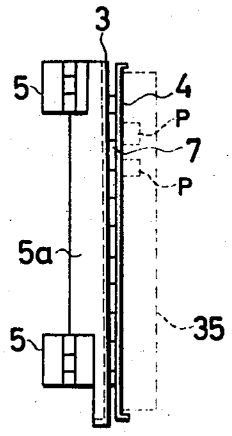
FIG. 3 is a side view of FIG. 2 showing diagrammatically the right hand side thereof.

FIG. 2 illustrates diagrammatically the front view of the front gate and FIG. 3 illustrates the right hand side of the above same wherein the reference numerals 3, 4, 5, 5a, 6 and the symbol p respectively designate the identical member with those as shown in FIG. 1. A recessed recessed window is provided on the panel 3. Printed circuit boards 13 are fixed on the window w. A screw 14 secures the circuit board 13 to the panel 3. Mechanisms similar to those identified as w,13,14 and p are also mounted on the panel 4.

Figure 6:
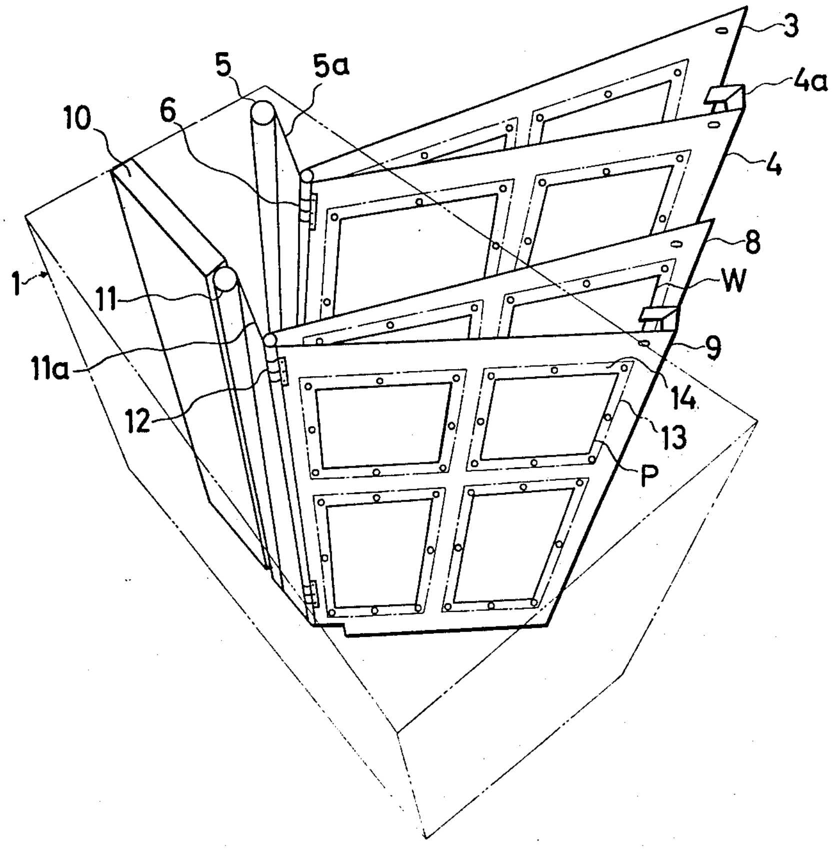
FIG. 6 is a perspective view in solidity of gate mechanism shown in FIGS. 1 – 5 to be taken by way of an embodiment with reference to a telephone exchange board.

The residuary part of said recessed window w may be used as a fixing frame for securing the print circuit board available to engage said print circuit board within said window as shown in FIGS. 2 and 6 a window w is provided at each panel, but said window w may be provided alternatively on only one of the panels. In case a window is provided on each of the panels, it is not necessary for them to be in alignment or to be equal in dimension or shape, but may be positioned appropriately according to the dimension, function and process for fixing said print circuit boards. if the recessed window w carries a printed circuit board, the latter can be inspected on its front side by swinging out by swinging out the assembly of which the boards form a part, and can be inspected on the reverse side by opening the panels forming the assembly. A lock mechanism at the edge of each panel allows the panel in each assembly to be locked together or disconnected so as to release each panel and to allow it to swing relative to the other.

In case the print circuit board is fixed to the panel utilizing said recessed window, there would be no necessity for providing any specific insulating means, because conductive circuit provided on said print circuit board which is facing to said panel will not to come into contact with said panel.

A recess formed at the lower ends of the panel on the right hand side thereof is provided for the purpose of allowing a connecting cable to be conveniently inserted into the panel. the foregoing optional accessory parts are mounted on the panels 3 and 4. The necessary wiring for connecting these accessory parts passes through the spaces 34 and 35. Similarly, accessory parts p are mounted on panels 8 and 9. The wiring for connecting these accessory parts appear in the spaces 88 and 89. The post 10, as well as the arm members 5a and 11a, are dimensioned to take into account the accessory parts and the associated wiring.

It will clearly be understood from the foregoing description, the panels 3 and 4 are provided with print circuit boards respectively having the accessory parts p fixed thereto or to be fixed thereto in such a manner that said print circuit boards are to be secured to the panel at the plane parallel thereto so as to block up the recessed window w of said panel, and said accessory parts are fixed to be deployed along the panels 3 and 4 respectively and at this time if the onesided print circuit board being used, the projecting surfaces of the fixed leg mounted on the accessory parts p for the panel 3 and the panel 4 are arranged to face oppositely at the gap g.

In such oppositely facing arrangement of said projecting surfaces, the bent portion 4a is formed at one end of the panel 4 as shown in FIG. 1, to meet the corresponding bent end 3a of the panel 3 located oppositely to the panel 4. The length of the bent portion for a corresponds to the dimensioned a—a of FIG. 1 and forms the gap between the two panels. The gap g prevents the accessory parts on the panels 3 and 4 from coming into contact with each other. The gap g may be adjusted by changing the size of the bent portion for a.

In order to effectively maintain the gap g, it is necessary to make the hinge 6 thick enough to correspond to the bent portion for a. This is simple if the gap is only a few millimeters thick. It will then be determined by the length of the portion for a and the diameter of the hinge 6.

Figure 4:
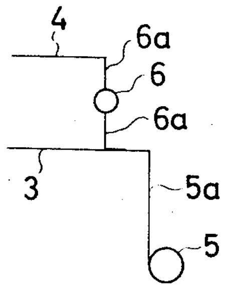
FIGS. 4*a* and 4*b* are, respectively diagrams showing an outline constructions of hinge-fixing member either to be applied in supplement for supporting a hinge, or to be applied in case two hinges are being used for maintaining necessary dimension.
Figure 4:
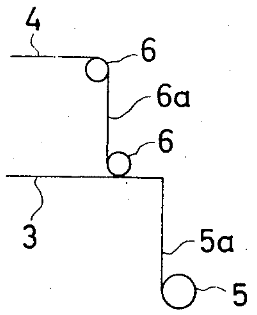
Figure 5:
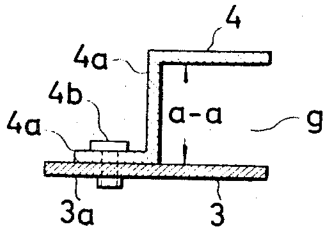
FIGS. 5*a* and 5*b* are, respectively diagrams showing, in outline mechanisms for fixing the relative positions of two different panels by means of securing means.
Figure 5:
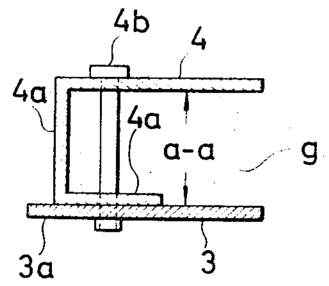

However, if the portion 4a is larger than the thickness of the hinge, the latter may be enlarged with fixing members 6a as shown in FIGS. 4a and 4b. In one case, the fixing member 6a is composed of two portions with the hinge 6 between them. In the other case, the fixing member 6a is composed of one portion between two hinge portions 6.

The above-mentioned bent end 3a of the panel 3 and corresponding bent end 4a of the panel 4 are adapted to form one part of the mechanism for securing the relative position of the panel 3 to the panel 4 by being secured to each other of fastening means 4b comprised with screws and nuts. The panels 3 together with the panel 4 may be withdrawn outward to pivot about said hinge 5 to the outside of the casing 1.

In such mechanism as above described two-sided wiring print circuit boards are able to be fixed to the panels 3 and 4 wherein the foregoing gap *g* may be made wide enough by establishing the length *a* — *a* at the bent end 4*a* and the width of the fixing member 6*a* of the hinge 6 so as to provide sufficient width for preventing the accessory parts secured to the print circuit boards fixed to the panel 3 and the panel 4 respectively from coming into contact with each other at opposing faces.

In other cases of fixing the one-sided wiring print circuit board to the panel 3 and the panel 4 respectively for securing the accessory parts thereto, said accessory parts may be secured in such a manner that the fixing legs of said accessory parts are settled to be oriented to the same direction contrary to the arrangement of the fixing legs of the accessory parts which are facing oppositely to each other as shown in FIG. 1. In this case, the pre-determined distance, that is, the gap *g* may be obtained by settling the length *a* - *a* of said bent end 4*a* and the width of the fixing member 6*a* of the hinge 6.

According to the present invention, which may be understood through the aforementioned elucidation, the front gate portion 1*a* of the casing 1 is opened or removed. Then subsequently the gap *g* is checked up for maintenance or inspection of the print circuit board at the soldered surface and others thereof in an embodiment shown in FIG. 1, in such a manner that the panel 3 and the panel 4 are gathered together pivoting about the hinge 5 and the front gate portion is withdrawn outward to the outside of the casing 1. The fastening means 4*b* for the bent end 3*a* of the panel 3 and the bent end 4*a* of the panel 4 is released to open the panel 3 apart from the panel 4 by pivoting about the hinge 6, so that each of the surfaces of the fixing legs of the accessory parts will be inspected. In the above case, the length (width) of the arm member is meant to be the radius of rotation for withdrawal of said front gate portion as well as to provide a spacing apart from the casing in operation as "a shelter" for said accessory parts after being withdrawn therefrom and the accommodating space is formed in minimum due to the settled angle $\theta$ in spite of being provided with said "shelter." After the front gate portion has been withdrawn outward to the outside of the casing 1 by pivoting about the hinge 5, the back gate portion is adapted to be withdrawn to the outside of the casing 1 by pivoting about the hinge 11, so that the back gate portion may obtain the position to avoid being and obstacle during operation even though the panels 3, 4 and 8, 9 are opened respectively at the outside of the casing 1 due to the establishment of the length and the position of the post 10, lengths and positions of the arm members 5*a*, 11*a* as well as the angle formed by the panels 3 and 8.

FIG. 6 is a perspective view illustrating vertically the gate structure shown in FIGS. 1 – 5 to be taken in concrete shape, by way of an embodiment, as a mounting frame of a telephone exchange wherein the casing is seen through in the diagonally rear direction therefrom in the condition that the bolt and nuts connecting between the front gate, the back gate and each panel of said gates are removed for opening four panels in a half way and each member designated by the identical reference numerals with corresponding members shown in FIGS. 1 and 2 will have the same function.

What is claimed is:

1. An electrical apparatus comprising a stationary mounting, hinge means forming a first axis, a pair of panels mounted on said hinge means for articulation about the first axis, circuit means mounted on each of said panels, said hinge means spacing said panels from each other, spacer means closer to the end of said panels opposite said hinge means than said hinge means for spacing said panels from each other so as to prevent contact between said circuit means on one panel and the other, connector means articulated on said hinge means, and second hinge means on said connector means forming a second axis parallel to the first axis for hingedly mounting said first hinge means and said connector means about said second axis, said second hinge means being mounted on said stationary mounting so that said connector means and said first hinge means can swing relative to said stationary mounting, said connector means extending along a plane between said hinge means and being sufficiently free of projections transverse to the plane so that said panels can swing to form acute angles at both sides of the plane.

2. An apparatus as in claim 1, wherein said staionary mounting includes housing means surrounding said panels and holding said second hinge means so that said connector means can articulate about second hinge means and move said first hinge means about said second hinge means and allow said panels to be selectively moved in and out of said housing means.

3. An apparatus as in claim 2, further comprising a second pair of panels, third hinge means forming a third axis for articulating said second pair of panels relative to each other and spacing them from each other, second connector means articulated about said third hinge means and projecting therefrom said second connector means extending along a second plane between said hinge means and being sufficiently free of projections transverse to the second plane so that said second pair of panels can swing to form acute angles at both sides of the second plane, fourth hinge means forming a fourth axis about which said second connector means articulates, and structural means in said housing for supporting said fourth hinge means and projecting towards the interior of said housing so that said fourth hinge means is further towards the interior of said housing in the direction of said panels when said panels are totally within said housing means for allowing said panels to be articulated about said third hinge means and said fourth hinge means into and out of said housing means.

4. An apparatus as in claim 2, wherein said first hinge means includes a hinge and separator means connecting said hinge to panels for establishing a space between panels.

5. An apparatus as in claim 2, wherein said spacer means includes a spacer member and a lock releasably locking said panels together while space by said spacer member.

6. An apparatus as in claim 2, wherein said circuit means includes printed circuit boards mounted on said panels, said panels forming windows for permitting portions of said printed circuit boards to project therethrough, said spacer and said hinge means forming a sufficient space between said panels to prevent the circuit means on one panel form touching the circuit means on the other panel.

7. An apparatus as in claim 2, wherein said connector means projects transversely from one of said panels.

8. An apparatus as in claim 3, wherein said spacer means includes a lock releasably locking the panels of said first pair to each other while they are spaced from each other.

9. An apparatus as in claim 3, wherein said second spacer means includes a lock for locking the panels of said second pair in position relative to each other.

10. An apparatus as in claim 1, wherein each of said panels includes a front and a back, and wherein said circuit means are mounted on each of said panels so that the major portion of the volume of said circuit means is mounted on the front of each of said panels, said panels being hinged from said first hinge means so as to be in back-to-back relationship.

11. An apparatus as in claim 3, wherein said spacer means is formed by a bend at the end of one of said panels.

12. An apparatus as in claim 11, wherein each of said panels includes a front and a back, and wherein said circuit means are mounted on each of said panels so that the major portion of the volume of said circuit means is mounted on the front of each of said panels, said panels being hinged from said first hinge means so as to be in back-to-back relationship.

* * * * *